(12) United States Patent
Sugiyama (10) Patent No.: US 6,178,459 B1
(45) Date of Patent: *Jan. 23, 2001

(54) DATA PROCESSING APPARATUS (75) Inventor: Etsuo Sugiyama, Shizuoka (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/728,853

(22) Filed: Oct. 10, 1996

(30) Foreign Application Priority Data

Oct. 24, 1995 (JP) .................................................... 7-275591

(51) Int. Cl.⁷ .................................................. G06F 15/173
(52) U.S. Cl. ........................................... 709/238; 709/225
(58) Field of Search ................................ 395/200.68, 676, 395/680, 800.25; 379/248, 272, 274; 709/238, 7, 300, 225, 239, 240, 241, 242, 243, 244; 712/25

(56) References Cited

U.S. PATENT DOCUMENTS

| | | | |
|---|---|---|---|
| 4,756,019 | * 7/1988 | Syzbicki ................................. | 379/112 |
| 5,291,489 | * 3/1994 | Morgan et al. ...................... | 370/85.1 |
| 5,377,327 | * 12/1994 | Jain et al. ............................. | 395/200 |
| 5,471,622 | * 11/1995 | Eadline ................................. | 395/650 |
| 5,577,030 | * 11/1996 | Oki et al. .............................. | 370/54 |

* cited by examiner

Primary Examiner—Zarni Maung
Assistant Examiner—Tod Kupstas
(74) Attorney, Agent, or Firm—Staas & Halsey LLP

(57) ABSTRACT

A data processing apparatus having a function of carrying out data process so that data flows between any nodes within a data network composed of a plurality of nodes via a communication channel for transmitting data unidirectionally includes a communication route matrix forming unit for forming a matrix constituted by a plurality of elements, each of which corresponds to the number of direct communication routes, directly linking each pair of nodes and including the above communication channels, so as to associate data-transmitting nodes with data-receiving nodes; a unit for calculating the number of patterns of communication routes that performs a given computation on the basis of the matrix formed by the communication route matrix forming unit, and thus calculates the number of patterns of all communication routes existing between a certain node and any one of the other nodes; and a unit for detecting a route between specified nodes that detects a specified pair of nodes, in which the number of patterns of communication routes calculated by the unit for calculating the number of patterns of communication routes is equal to or larger than a predetermined value, as patterns of communication routes causing a deadlock.

7 Claims, 10 Drawing Sheets

DATA PROCESSING APPARATUS

BACKGROUND OF THE INVENTION

1. Field of the Invention

The present invention relates to a data processing apparatus for processing a large amount of data efficiently according to a batch processing system, in which data flows unidirectionally between any nodes within a data network, in the fields of banking business, distribution industry, service industry, or the like.

In recent years, the amount of data which is to be processed by a mainframe has rapidly increased owing to an enlargement in business or an introduction of electronic data processing (EDP) systems. The time required for handling a batch job that processes a large amount of data has remarkably increased.

By the way, in the fields of banking business, distribution industry, service industry, or the like, a tendency toward the extension of time required for an online job has become outstanding. The finish time of a nighttime batch job, which is to be carried out in the nighttime after the online job has finished, may be the time in the midnight or in the early morning of the next day. This brings about tendencies not only for an increase in operation cost, but also for an adverse effect on the online job the next day. For this reason, it has become very necessary to realize a relatively fast batch process. A function developed in an effort to cope with this situation is a parallel batch job, that is, an "Excel Batch".

The present invention pertains to a techniques for detecting, in advance, an occurrence of a deadlock corresponding to a wait state for transmission or reception of data, which is likely to occur during implementation of an Excel Batch that is a function of shortening the processing time for a batched job in a general-purpose computer.

2. Description of the Related Art

Now, a background of the Excel Batch, that has come to be employed in a conventional data processing system, will be briefly described in order to clarify the ability of an Excel Batch to shorten the processing time for a batch job.

A method generally adopted in an ordinary routine batch process is such that one job is divided into a plurality of jobs or job steps, and that a temporary data set is used to link the thus divided jobs or job steps. These jobs or job steps are processed sequentially. The Excel Batch realizes a relatively fast batch process by paying special attention to this point. The Excel Batch allows jobs or job steps, which are conventionally executed sequentially, to be processed in parallel by making access to data stored in a temporary data set.

Inherited data flowing between different jobs or job steps utilizes system storage. This makes it possible to solve a problem related to an input/output process that becomes a bottleneck for a direct access storage device (DASD).

In a conventional batch process in which an Excel Batch is not utilized, a succeeding job or job step cannot accept data until a preceding job or job step outputs all the data to a temporary data set (that is, an intermediate data set). Jobs or job steps are therefore executed sequentially. Consequently, a large lapse of time (i.e., a lot of execution time) occurs. Moreover, since the inherited data is transferred via a DASD, magnetic tape (MT), or the like, much input/output time is needed.

On the contrary, the Excel Batch makes it possible to execute a preceding job or job step and a succeeding job or job step in parallel, and to output or input data between jobs or job steps, by using a plurality of pipe data sets residing in system storage.

By utilizing such an Excel Batch, the lapse of time (i.e., the amount of time or execution time) can be shortened owing to an execution of jobs or job steps, and the input/output time required to inherit data between jobs or job steps via a system storage can be shortened. Eventually, the lapse of time required for such a batch process can be shortened drastically.

The Excel Batch has been designed exclusively for fields of business in which realizing a relatively high-speed batch process is an important subject (banking business, manufacturing industry, insurance business, distribution industry, service industry, securities financing, public utilities, and the like), and has proved effective when adapted for a routine batched job which is to be executed in batch processing systems ranging from medium-scale system through large-scale system.

Even when the Excel Batch is used, it is unnecessary to modify programs written in a high level language (COBOL or PL/I) that adopts a conventional data management access method (QSAM or BSAM). However, a modification is needed to some degree for job control languages (JCLs), i.e., job control language statements. One of the reasons is that an execution of jobs in parallel is a new concept. Moreover, the Excel Batch can be applied to input/output files which are to be handled by a sort/merge program.

Furthermore, in the Excel Batch, the pipe data set is used as a data set in system storage which is used to transfer data between jobs or job steps that are to be executed in parallel.

Data output from a preceding job or job step are passed immediately to a succeeding job or job step via a pipe data set. When the data has been passed to the succeeding job or job step, data in the pipe data set are deleted. Thus, the pipe data set is utilized as an area temporarily holding data (i.e., a storage area) in a system storage. Even if the amount of inherited data is relatively large, the data can be processed in a small area in the system storage. Thus, the system storage can be utilized effectively.

In other words, the Excel Batch is a function for temporarily holding data which are to be inherited between a preceding job or job step of a batch job and a succeeding job or job step thereof in a pipe data set in the system storage, transmitting or receiving the data by a unit of a record or block, from or to the pipe data set so that various processes which are required for the data can be carried out in parallel, and thus contributing to a drastic reduction of processing time.

In the prior art, the lapse of time required for a batch process has been remarkably shortened by adopting a data processing system in which the Excel Batch can be used for the batch process.

Herein, it should be noted that within the foregoing ability of the Excel Batch, each of a plurality of pipe data sets has a predetermined storage capacity. When the amount of data in each pipe data set exceeds the above storage capacity, since the timing of a data writing portion differs from that of a data reading portion, the data stagnates (i.e., the data does not flow). Therefore, a wait state occurs with regard to a transmission request for the pipe data set.

When a function of the Excel Batch having the foregoing features is adapted to a conventional data processing system, job steps that have been executed sequentially will operate in parallel. Depending on a logical instruction of an application program, a wait state for transmission or reception of data may be established. This leads to the fear of causing a so-called "deadlock".

For clarifying the problem that the conventional data processing system utilizing a function of the Excel Batch is prone to a deadlock, a pattern of communication routes causing a deadlock will be described with reference to a conceptional diagram of FIG. 1. Herein, for simplifying the explanation about such a pattern, a job composed of two job steps and two pipe data sets (hereinafter, these pipe data sets will sometimes be referred to as "pipes") will be taken for instance.

Figure 1:
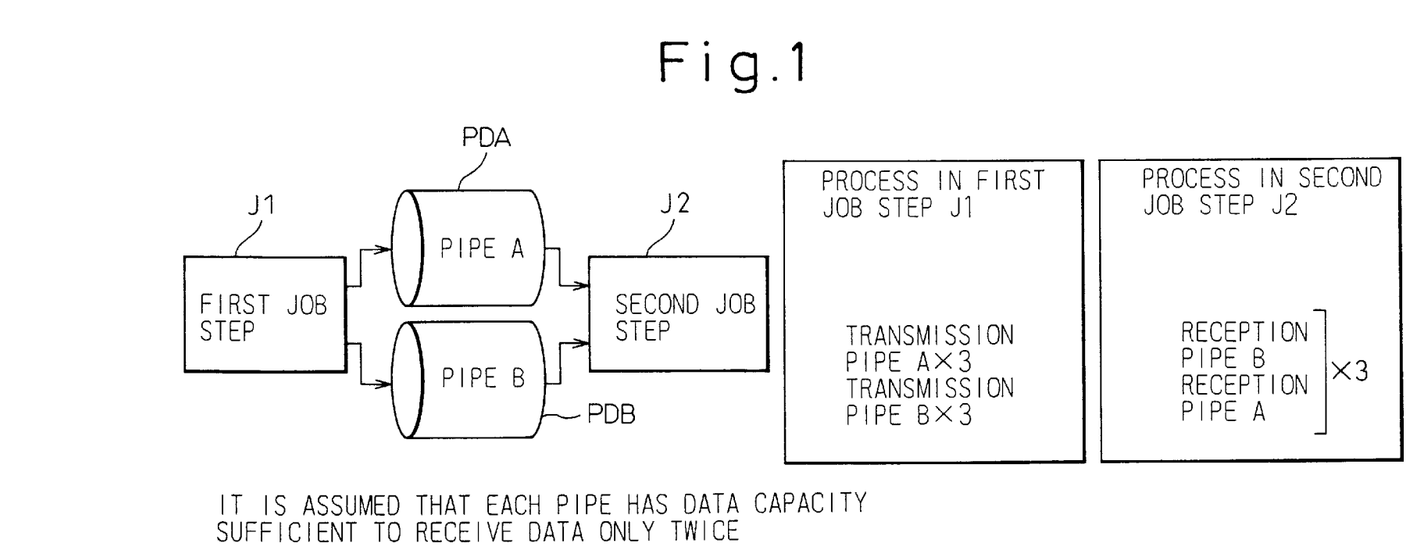
FIG. 1 is a conceptional diagram for explaining the problem encountered with a conventional data processing system.

In FIG. 1, it is assumed that each of a first pipe data set PDA and a second pipe data set PDB (referred to as pipes A and B in FIG. 1, respectively) has a data capacity sufficient to transmit or receive the amount of data only twice.

In FIG. 1, after a first job step J1 transmits data three times to a pipe A, the first job step J1 shall transmit data three times to a pipe B. A second job step J2 receives data three times from pipes A and B alternatively.

The first job step J1 causes a transmission wait state when the data transmission is carried out at the third time relative to the pipe A. The second job step J2 causes a reception wait state when the data reception is carried out at the first time relative to the pipe B.

In this case, all job steps become a wait state for transmission or reception. The batch process is therefore discontinued, and a deadlock has occurred. Once a deadlock state corresponding to such a deadlock is established, such a deadlock state will not be cancelled.

This occurrence of a deadlock may not be recognized until several hours have elapsed after a job is started. This causes a problem in that the function of an Excel Batch cannot be utilized effectively.

Patterns of communication routes having a possibility of causing a deadlock due to an occurrence of a wait state for data transmission or reception are presumably patterns of communication routes that consist of two or more than two communication routes through which data flows from a certain job step to another job step via a pipe.

SUMMARY OF THE INVENTION

Accordingly, an object of the present invention is to provide a data processing apparatus which is capable of detecting, in advance, patterns of communication routes causing a deadlock due to an occurrence of a wait state for data transmission or reception when a large amount of data are processed in parallel by utilizing the function of an Excel Batch.

In order to accomplish the above object, a data processing apparatus of the present invention comprises a communication route matrix forming means that when data are processed so that data flows between any nodes within a data network composed of a plurality of nodes via communication channels through which data are transmitted unidirectionally, forms a matrix constituted by a plurality of elements, each of which corresponds to the number of direct communication routes, directly linking each pair of nodes and including the above communication channels, so as to associate data-transmitting nodes with data-receiving nodes; a means for performing a given computation on the basis of the matrix formed by the communication route matrix forming means, and calculating the number of patterns of communication routes that calculates the number of patterns of all the communication routes existing between a certain node and any one of the other nodes; and a means for detecting a route between specified nodes that detects a pair of nodes, in which the number of patterns of communication routes calculated by the means for calculating the number of patterns of communication routes is equal to or larger than a predetermined value, as a specified pair of nodes. Herein, a warning message, indicating that a wait state for data transmission or reception is established, is output to the specified pair of nodes.

Preferably, the means for calculating the number of patterns of communication routes has a function of calculating the number of patterns of all communication routes existing between each pair of nodes. In this case, when a direct or indirect communication route extends from one of a pair of nodes linked by a direct communication route to any one of the other nodes, the number of the associated element in the matrix is increased by the number of the above-mentioned direct or indirect communication routes.

More preferably, in the data processing apparatus of the present invention, when a job control language (JCL) is input to the data network, if data is processed through a parallel batch process, a plurality of job steps in the job control language are associated with the nodes, respectively, and pipe data sets serving as temporary storage areas for data are associated with the communication channels, respectively.

According to the present invention, the numbers of patterns of all communication routes through which data flows from a given node in the data network to any one of the other nodes can be calculated by computing the number of elements in the matrix. Patterns of communication routes each having a value of two (2) or larger than 2 are detected, whereby patterns of communication routes having a possibility of a deadlock can be identified easily.

In the prior art, an occurrence of a deadlock may not be recognized until several hours have elapsed after a job is started. In contrast, the present invention enables detection of patterns of communication routes causing a deadlock prior to the start of a job.

Further, when the present invention is adapted to a batched job, a possibility of a deadlock resulting from transmission or reception of data between processes operating in parallel within a network, e.g., an Excel Batch, can be recognized before any operation within the network is started.

BRIEF DESCRIPTION OF THE DRAWINGS

The above object and features of the present invention will be more apparent from the following description of the preferred embodiment with reference to the accompanying drawings, wherein.

DESCRIPTION OF THE PREFERRED EMBODIMENTS

Referring to the appended drawings (FIGS. 2 to 9), a basic embodiment and preferred embodiment of the present invention will be described below.

Figure 2:
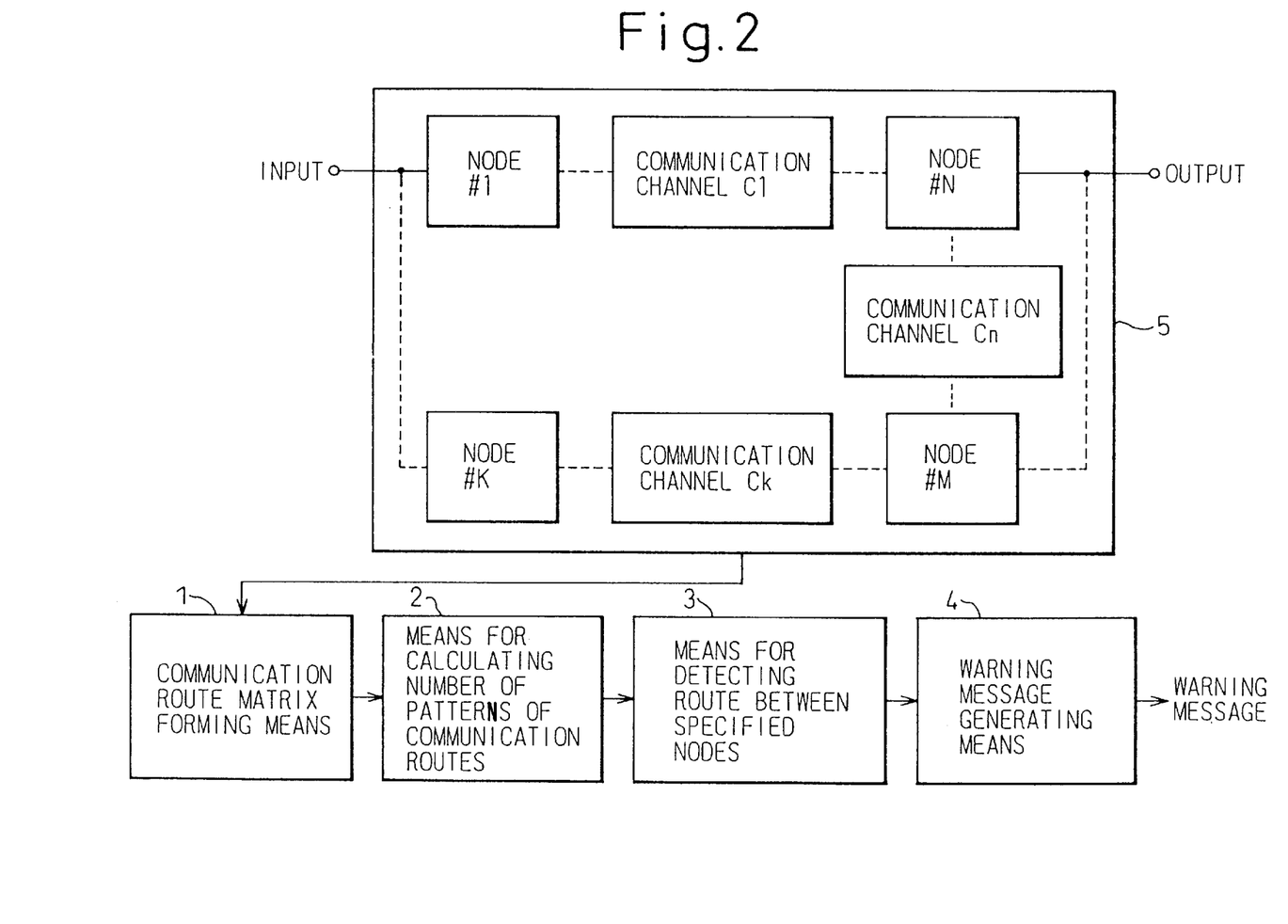
FIG. 2 is a block diagram showing a basic embodiment based on the principle of the present invention.

FIG. 2 is a block diagram showing a basic embodiment based on the principle of the present invention. The basic embodiment of the present invention is concerned with a data processing apparatus in which data is processed so that data flows between any nodes within a data network 5 composed of a plurality of nodes #1, . . . #K, . . . #M, . . . and #N (where K, M, and N are positive integers), and $1 \leq K$ (or $M \leq N$ is established) via any of communication channels C1, . . . Ck, . . . Cm, . . . and Cn (where k, m, and n are positive integers), and $1 \leq k$ (or $m \leq n$ is established) through which data is transmitted unidirectionally.

As shown in FIG. 1, a data processing apparatus related to the basic embodiment of the present invention includes a communication route matrix forming means 1 for forming a matrix constituted by a plurality of elements, each of which corresponds to the number of direct communication routes, directly linking each pair of the nodes and including a communication channel, so as to associate data-transmitting nodes with data-receiving nodes; a means for calculating the number of patterns of communication routes 2 that performs a given computation on the basis of the matrix formed by the communication route matrix forming means 1 and thus calculates the number of patterns of all the communication routes existing between a certain node and any one of the other nodes; and a means for detecting a route between specified routes 3 that detects a pair of nodes, in which the number of patterns of communication routes calculated by the means for calculating the number of patterns of communication routes 2 is equal to or larger than a predetermined value (for example, two or larger than two), as a specified pair of nodes.

Furthermore, the data processing apparatus of the present invention is designed to output a warning message indicating that a wait state for data transmission or reception is established for the specified pair of nodes detected by the means for detecting a route between specified nodes 3. The warning message is generated by, for example, a warning message generating means 2.

Preferably, the means for calculating the number of patterns of communication routes 2 calculates the number of all the communication routes existing between each pair of nodes. In this case, when a direct or indirect communication route extends from one of a pair of nodes linked by a direct communication route to any one of the other nodes, the number of the associated element in the matrix is increased by the number of the above-mentioned direct or indirect communication routes.

More preferably, in the basic embodiment of the present invention, when a job control language is input to a data network 5, if data is processed through a parallel batch process, a plurality of job steps in the job control language are associated with the nodes, respectively, and pipe data sets serving as temporary storage areas for data are associated with the communication channels, respectively. Thus, a data processing apparatus having the function of an Excel Batch can be constituted.

In the data processing apparatus according to the basic embodiment of the present invention, a plurality of job steps in a job control language are recognized as nodes, and pipe data sets serving as temporary storage areas for data are recognized as communication channels. The communication route matrix forming means 1 and the means for calculating the number of patterns of communication routes 2 calculate the number of patterns of communication routes extending from any node within the data network 5 to any one of the other nodes according to a technique that will be described below.

First, when an external factor (job control language or the like) is given, matrix D having elements $d_{ij}$ provided as an expression No. 1 mentioned below is produced on the basis of the relationship among direct communication channels each interposed between a data-transmitting node and a data-receiving node.

Expression No. 1

$d_{ij}$=the number of communication channels directly linking node i and node j Next, a matrix E having elements $e_{ij}$ provided as described below is produced on the basis of a matrix D having the elements $d_{ij}$.

$e_{ij}$=(loop i=1 to N (f(i)) (N denotes the total number of nodes)

f(i)=(loop j=1 to N $(e_{ij}=e_{ij}+d_{ij}$ if $d_{ij}=1$, then (f(j)))

The thus produced matrix E provides the numbers of patterns of communication routes from node to node.

Figure 3:
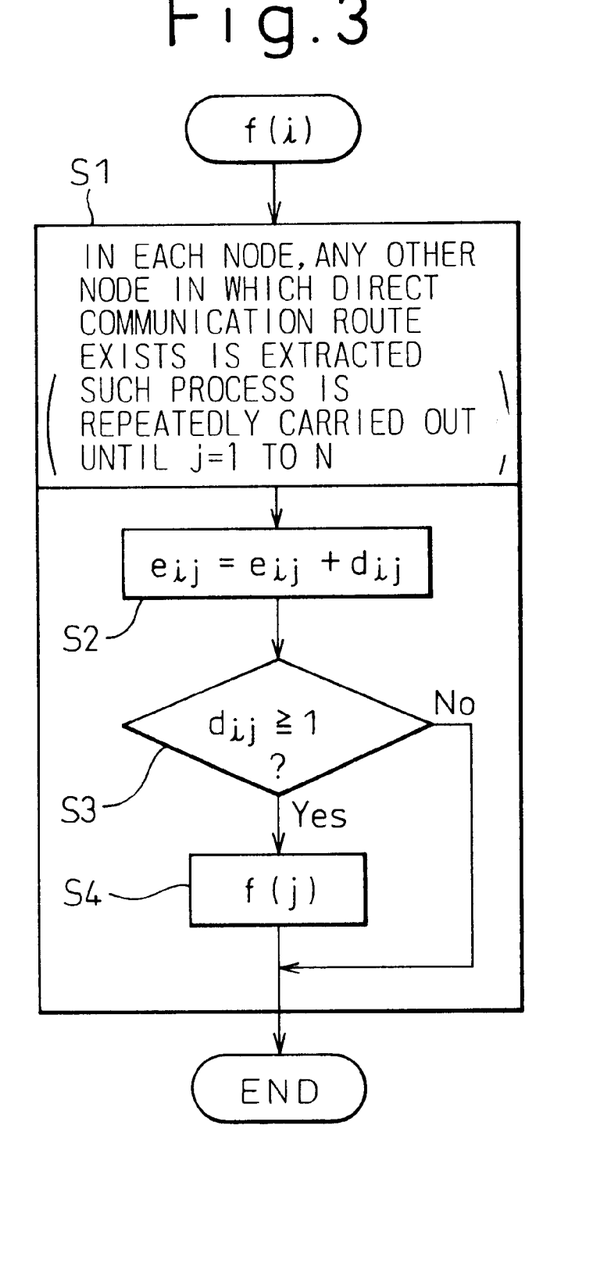
FIG. 3 is a flowchart for explaining the operations of the main part of the embodiment shown in FIG. 2.

The function f(i) expressing the elements $e_{ij}$ of matrix E enables, as shown in the flowchart of FIG. 3, a calculation of each element $e_{ij}$, that is, the number of patterns of all communication routes existing between each pair of nodes. Referring to a flowchart of FIG. 3, a procedure for determining the number of patterns of communication routes using the function f(i){f(j)} will be described.

First, at step S1 in FIG. 3, any other node with which each of nodes #1 to #N is linked by a direct communication route, is extracted, and the corresponding element $d_{ij}$ is set to 1.

Next, at step S2, the matrix E having elements $e_{ij}$ is produced on the basis of matrix D having the elements $d_{ij}$. It is checked whether or not a direct or indirect communication route extends from any other node linked with each of nodes #1 to #N by a direct communication route (node satisfying the condition of $d_{ij} \geq 1$ at step S3) to yet other node (or other nodes). For each pair of nodes from one of which a direct or indirect communication route extends, the function f(j) (step S4) is used to give an increment to (or increase) the corresponding element $e_{ij}$ in matrix E by the number of the above-mentioned direct or indirect communication routes (step S2).

As described above, patterns of communication routes having a possibility of causing a deadlock due to an occurrence of a wait state for data transmission or reception is considered to be patterns of communication routes consisting of two or more than two communication routes through which data flows from a certain node to any one of the other nodes via a communication channel.

When the elements $e_{ij}$ of matrix E are checked to determine if any element has a value of two or larger than two, a specified pair of nodes having a possibility of a deadlock can be identified easily.

For clarifying the aspect of the data processing apparatus in accordance with the basic embodiment of the present invention, a detailed procedure for detecting a pair of nodes having a possibility of a deadlock will be described using a model of a more particular data network.

Figure 4:
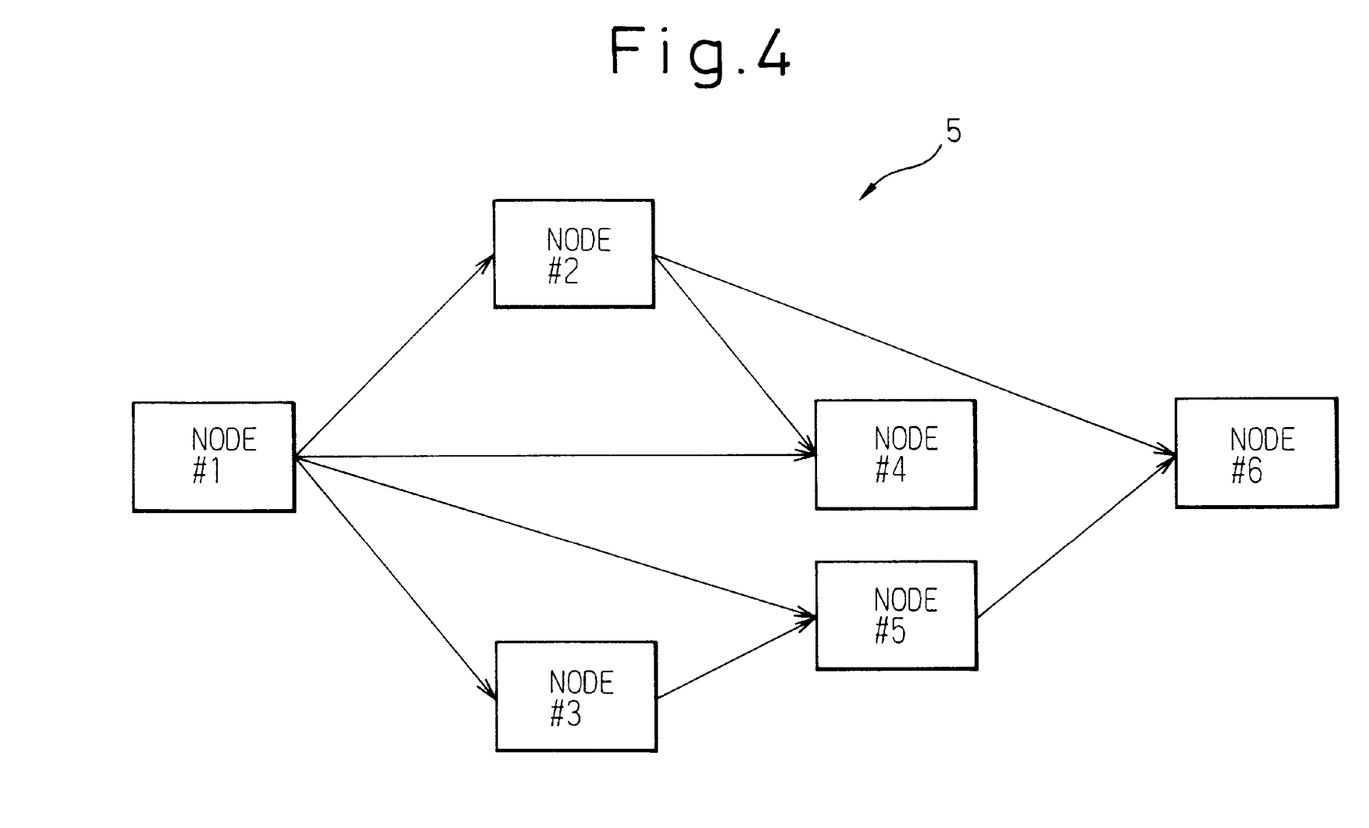
FIG. 4 shows an example of a model of a data network for explaining an aspect of the basic embodiment of the present invention.

FIG. 4 shows an example of a model of a data network for explaining an aspect of the basic embodiment of the present invention. Herein, calculating the number of patterns of communication routes through which data flows from a given node to any one of the other nodes will be described as a typical example using the model of the data network 5 composed of six nodes (nodes #1 to #6). Moreover, for simplifying the explanation about such a model, communication channels each interposed between nodes will be omitted.

In the model of the data network 5 in FIG. 4, when an external factor such as a job control language is given, nodes #1 to #6 are checked to determine if a direct communication route extends from each of the nodes serving as a data-transmitting node to another node serving as a data-receiving node according to a procedure of steps (1) to (9) described below. Thus, a matrix D shown in Table 1 is completed.

Procedure for Producing Matrix D (1) First, the matrix D shown in Table 1 (direct data transfer table with initial values 0) is produced.

(2) Since a direct communication route extends from node #1 to node #2, an element (1,2) in the matrix D is increased by one.

(3) Since a direct communication route extends from node #1 to node #3, an element (1,3) in the matrix D is increased by one.

(4) Since a direct communication route extends from node #1 to node #4, an element (1,4) in the matrix D is increased by one.

(5) Since a direct communication route extends from node #1 to node #5, an element (1,5) in the matrix D is increased by one.

(6) Since a direct communication route extends from node #2 to node #4, an element (2,4) in the matrix D is increased by one.

(7) Since a direct communication route extends from node #2 to node #6, an element (2,6) in the matrix D is increased by one.

(8) Since a direct communication route extends from node #3 to node #5, an element (3,5) in the matrix D is increased by one.

(9) Since a direct communication route extends from node #5 to node #6, an element (5,6) in the matrix D is increased by one.

TABLE 1

Matrix D (data network model)

| Transmission node | | Reception node | | | | | |
| --- | --- | --- | --- | --- | --- | --- | --- |
| | | Node #1 | Node #2 | Node #3 | Node #4 | Node #5 | Node #6 |
| | | 1 | 2 | 3 | 4 | 5 | 6 |
| Node #1 | 1 | 0 | 1 | 1 | 1 | 1 | 0 |
| Node #2 | 2 | 0 | 0 | 0 | 1 | 0 | 1 |

TABLE 1-continued

Matrix D (data network model)

| Transmission node | | Reception node | | | | | | |
| --- | --- | --- | --- | --- | --- | --- | --- | --- |
| | | Node #1 | Node #2 | Node #3 | Node #4 | Node #5 | Node #6 | |
| | | 1 | 2 | 3 | 4 | 5 | 6 | |
| Node #3 | 3 | 0 | 0 | 0 | 0 | 1 | 0 | ← Elements $d_{ij}$ |
| Node #4 | 4 | 0 | 0 | 0 | 0 | 0 | 0 | |
| Node #5 | 5 | 0 | 0 | 0 | 0 | 0 | 1 | |
| Node #6 | 6 | 0 | 0 | 0 | 0 | 0 | 0 | |

Next, based on the matrix D in Table 1, pairs of nodes each linked by a direct communication route are checked to determine if a direct or indirect communication route is extending from one node of each pair to another node or other nodes. For a pair of nodes from one of which the direct or indirect communication route is extending to another node or other nodes, the associated element $e_{ij}$ in the matrix E is increased by the number of the direct or indirect communication routes. Thus, the matrix E shown in Table 2 mentioned below is produced. For associating the elements $e_{ij}$ with the below-mentioned steps (a) to (n) in the procedure for producing the matrix E, the same symbols ((a) to (n)) as these steps are written in the matrix E in Table 3.

Procedure for Producing Matrix E (a) Since an element (1,2) in the matrix D is 1, the element (1,2) in the matrix E is increased by one.

(b) Referring to elements (2,n) in the matrix D, since an element (2,4) in the matrix D is 1, an element (1,4) in the matrix E is increased by one. Referring to elements (4,n) in the matrix D, since all the elements are 0, nothing is done.

(c) Since an element (2,6) in the matrix D is 1, the element (2,6) in the matrix E is increased by one. Referring to elements (6,n) in the matrix D, since all the elements are 0, nothing is done.

(d) Since an element (1,3) in the matrix D is 1, the element (1,3) in the matrix E is increased by one.

(e) Referring to elements (3,n) in the matrix D, since an element (3,5) in the matrix D is 1, an element (1,5) in the matrix E is increased by one.

(f) Referring to elements (5,n) in the matrix D, since an element (5,6) in the matrix D is 1, an element (1,6) in the matrix E is increased by one.

(g) Since an element (1,4) in the matrix D is 1, the element (1,4) in the matrix E is increased by one. Referring to elements (4,n) in the matrix D, since all the elements are 0, nothing is done.

(h) Since an element (1,5) in the matrix D is 1, the element (1,5) in the matrix E is increased by one.

(i) Referring to elements (5,n) in the matrix D, since an element (5,6) in the matrix D is 1, an element (1,6) in the matrix E is increased by one.

(j) Since an element (2,4) in the matrix D is 1, the element (2,4) in the matrix E is increased by one. Referring to elements (6,n) in the matrix D, since all the elements are 0, nothing is done.

(k) Since an element (2,6) in the matrix D is 1, the element (2,6) in the matrix E is increased by one. Referring to elements (6,n) in the matrix D, since all the elements are 0, nothing is done.

(l) Since an element (3,5) in the matrix D is 1, the element (3,5) in the matrix E is increased by one.

(m) Referring to elements (5,n) in the matrix D, since an element (5,6) in the matrix D is 1, an element (3,6) in the matrix E is increased by one.

(n) Since an element (5,6) in the matrix D is 1, the element (5,6) in the matrix E is increased by one. Referring to elements (6,n) in the matrix D, since all the elements are 0, nothing is done.

TABLE 2

Matrix E (data network model)

| Transmission node | | Reception node | | | | | |
|---|---|---|---|---|---|---|---|
| | | Node #1 1 | Node #2 2 | Node #3 3 | Node #4 4 | Node #5 5 | Node #6 6 |
| Node #1 | 1 | 0 | 1 | 1 | 2 | 2 | 3 |
| Node #2 | 2 | 0 | 0 | 0 | 1 | 0 | 1 |
| Node #3 | 3 | 0 | 0 | 0 | 0 | 1 | 1 | ← Elements $e_{ij}$
| Node #4 | 4 | 0 | 0 | 0 | 0 | 0 | 0 |
| Node #5 | 5 | 0 | 0 | 0 | 0 | 0 | 1 |
| Node #6 | 6 | 0 | 0 | 0 | 0 | 0 | 0 |

TABLE 3

Detailed procedure until production of matrix E is completed (data network model)

| Transmission node | | Reception node | | | | | |
|---|---|---|---|---|---|---|---|
| | | Node #1 1 | Node #2 2 | Node #3 3 | Node #4 4 | Node #5 5 | Node #6 6 |
| Node #1 | | | (a) | (d) | (b)(g) | (e)(h) | (c)(f)(i) |
| Node #2 | | | | | (j) | | (k) |
| Node #3 | | | | | | (l) | (m) | ← Elements $e_{ij}$
| Node #4 | | | | | | | |
| Node #5 | | | | | | | (n) |
| Node #6 | | | | | | | |

Each element $e_{ij}$ of the thus produced matrix E indicates the number of paths, that is, the number of patterns of communication routes through which data flows between respective processes (between respective pairs of nodes).

According to the present invention, once the value of an element in the matrix E is computed, the number of patterns of all communication routes, through which data flows from a given node within a data network to another node, can be calculated. Moreover, when a pair of nodes in which the number of patterns of communication routes is two or larger than two is detected in the matrix E, patterns of communication routes having a possibility of a deadlock can be identified easily.

Consequently, although an occurrence of a deadlock has not been detected until several hours have elapsed after the start of a job according to the prior art, an application of the present invention for a data processing apparatus enables a detection of patterns of communication routes causing a deadlock prior to the start of a job.

Furthermore, when the present invention is adapted for a batched job, a possibility of a deadlock caused by a transmission or reception of data between processes operating in parallel within a network, e.g., by an Excel Batch, can be recognized before any operation within the network is started.

Figure 5:
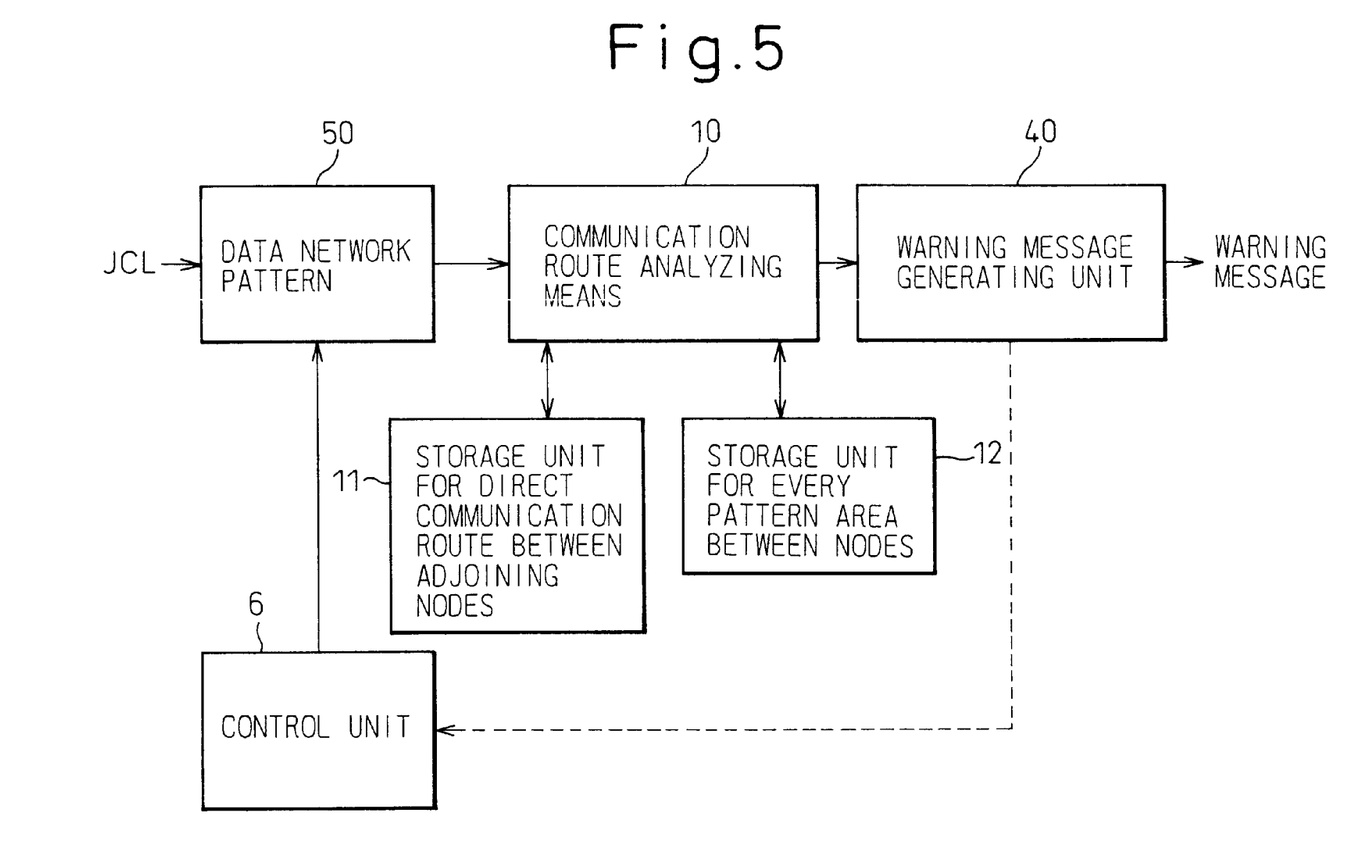
FIG. 5 is a block diagram showing the configuration of a preferred embodiment.

FIG. 5 is a block diagram showing the configuration of a preferred embodiment of the present invention. Herein, a data processing apparatus of the present invention realized with a computer system including a central processing unit (CPU) and microprocessor unit (MPU) will be shown as a typical example. Thereinafter, components identical to the aforesaid ones will be assigned the same reference numerals.

In FIG. 5, a data network pattern 50 in which data flows according to a parallel batch process with the input of a job control language is illustrated as a typical example of the aforesaid data network 5 (for example, FIG. 2). In the data network pattern 50, a plurality of job steps within a job control language are recognized as nodes, and pipe data sets serving as temporary storage areas for data are recognized as communication channels each linking a pair of nodes.

Moreover, in FIG. 5, a communication route analyzing means 10 is provided as the communication route matrix forming means 1, the means for calculating the number of patterns of communication routes 2, and the means for detecting a route between specified nodes 3, shown in FIG. 2. The communication route analyzing means 10 can be realized by a CPU or MPU.

Further, in the computer system having the communication route analyzing means 10, a storage unit 11 for a direct communication route between adjoining nodes, and a storage unit 12 for every pattern area between nodes which are constituted by a RAM or the like, are provided. A RAM inherently incorporated in the CPU or MPU may be used as the RAM forming the storage unit 11 for a direct communication route between adjoining nodes and the storage unit 12 for every pattern area between nodes.

To be more specific, the storage unit 11 for a direct communication route between adjoining nodes stores the contents of the matrix D produced by using as each element the number of direct communication routes each directly linking adjoining nodes. The storage unit 12 for every pattern area between nodes stores the contents of the matrix E produced by using as each element the number of patterns of direct or indirect communication routes existing between a given node and another node, that is, all the communication routes existing between each pair of nodes.

In FIG. 5, a warning message generating unit 40 is provided as the warning message generating means 4 in FIG. 2. When it is detected, as a result of analysis carried out by the communication route analyzing means 10, that a pattern of communication routes between nodes includes two or more than two communication routes, the warning message generating unit 40 outputs a warning message indicating that there is a possibility of a deadlock at the pair of nodes.

Further, in FIG. 5, a control unit 6 is provided, which can be realized by a CPU or MPU. The control unit 6 allows the computer system to identify a pair of nodes having a possibility of a deadlock, before data flow through the data network pattern 50 (before a job is started) in accordance with a warning message sent from the warning message generating unit 40.

In the foregoing embodiment, a pattern of communication routes causing a deadlock can be detected easily before a process is executed. It therefore becomes possible to recognize an occurrence of a deadlock, which is likely to occur when a parallel data process is carried out by using an Excel Batch corresponding to a function of shortening the processing time of a batch job, prior to the start of a job.

For clarifying the relationship between the batch processing system utilizing the function of an Excel Batch and the data processing apparatus of the present invention, a difference in a sequence of data process between the Excel Batch is not used for a particular batch job and when the Excel Batch is used therefor, will be described with reference to FIGS. 6 to 8.

Figure 6:
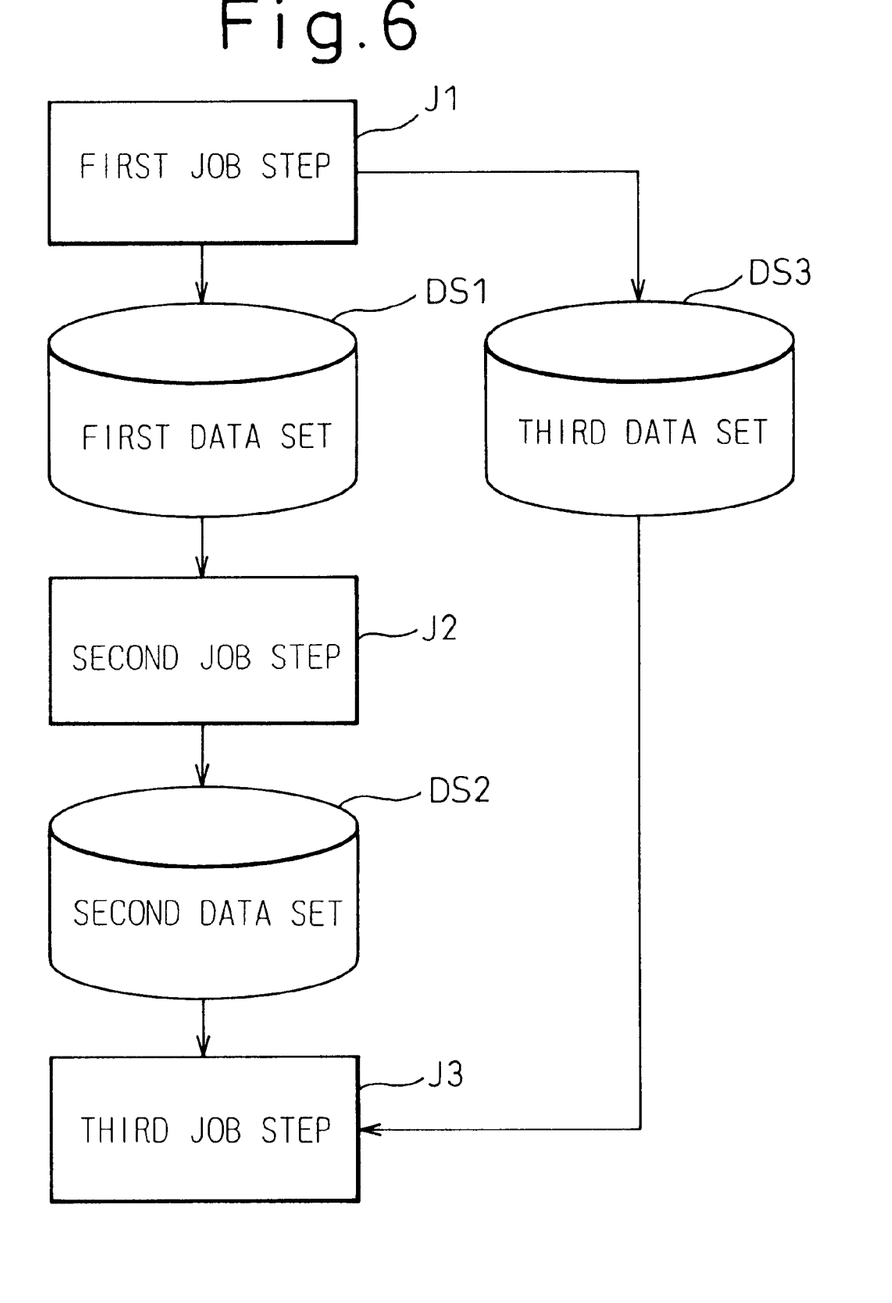
FIG. 6 is a data flowchart showing an example of a batch for processing data employed in explaining the relationship between a data processing apparatus of the preferred embodiment and an Excel Batch.

FIG. 6 is a data flowchart showing an example of a batch for processing data employed in explaining the relationship between the data processing apparatus in accordance with the preferred embodiment of the present invention and an Excel Batch; FIG. 7 is a data flowchart showing a sequence of data processes which are to be performed when a function other than an Excel Batch is used to process a job; and FIG. 8 is a data flowchart showing a sequence of data processes which are to be performed when Excel Batch is used to process a job.

Herein, as shown in FIG. 6, a sequence of data processes will be described by taking a job composed of three job steps and two data sets (that is, temporary data sets) as a typical example.

In the job shown in FIG. 6, a first job step J1 writes data in a first data set DS1 and third data set DS3. A second job step J2 reads out data from the first data set DS1 and writes data in a second data set DS2. A third job step J3 reads data from the second data set DS2 and third data set DS3. The sequence of data processes from the first job step through the third job steps are executed, whereby a batch job is carried out.

Figure 7:
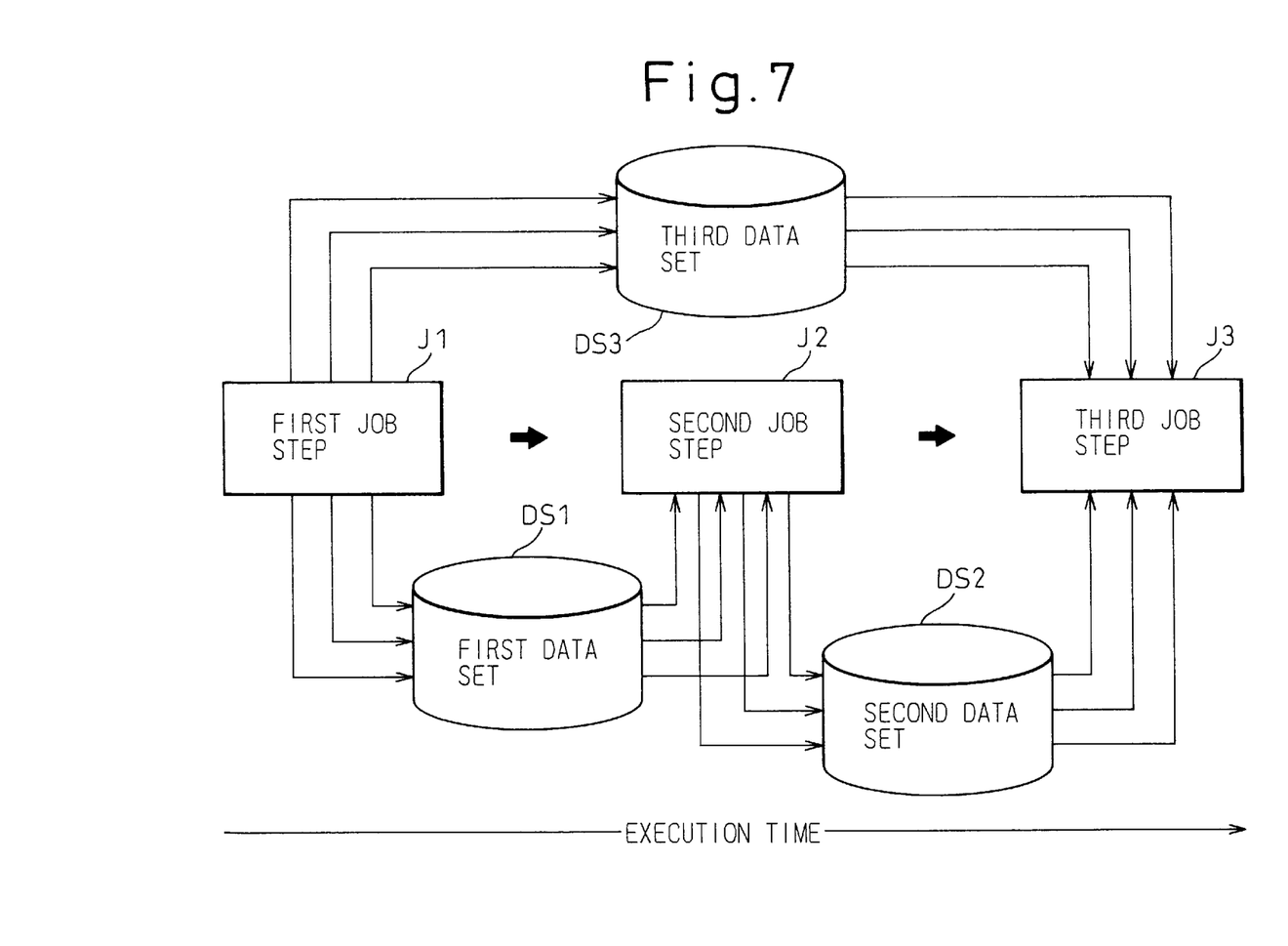
FIG. 7 is a data flowchart showing a sequence of data processes which are to be performed when a function other than an Excel Batch is used for a job process in FIG. 6.

When an Excel Batch is not used but ordinary temporary data sets (first to third data sets) are used to execute each data process of the job shown in FIG. 6, a flow of data is represented as a sequence of data process shown in FIG. 7. When the ordinary temporary data sets shown in FIG. 7 are used, unless a temporary data set is created in advance at a preceding job step, a succeeding job step cannot operate.

The first to third job steps of data process can be executed only sequentially. The overall execution time of the job is therefore the sum of the execution time of each of the first job step J1, second job step J2, and third job step J3.

By contrast, when the Excel Batch is used, pipe data sets can be used in place of the temporary data sets. In this case, a flow of data is represented as a sequence of the data processes shown in FIG. 8.

Figure 8:
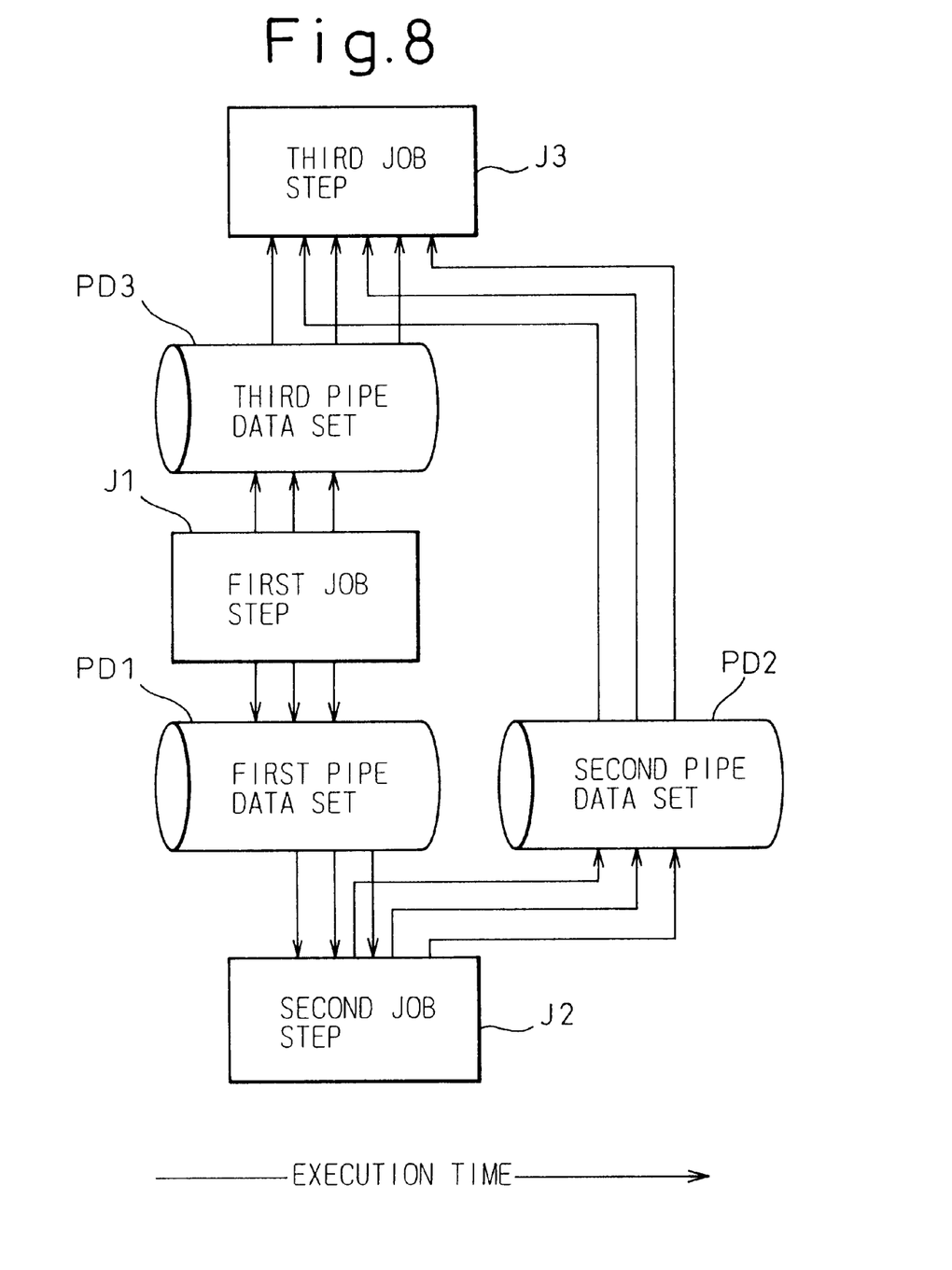
FIG. 8 is a data flowchart showing the sequence of data processes which are to be performed when an Excel Batch is used for job process in FIG. 6.

In FIG. 8, as soon as the first job step J1 starts to write data in a first pipe data set PD1, the second job step J2 can receive the data. A second pipe data set PD2 or third pipe data set PD2 between other job steps plays a role similar to that of the first pipe data set PD1. The first to third job steps can therefore be executed concurrently. The overall execution time of a job can eventually be shortened drastically.

In other words, when a plurality of job steps are executed in parallel using an Excel Batch, data transfer between job steps can be achieved by the unit of a record or block via a storage unit such as a pipe data set. The overall execution time of a job can therefore be shortened drastically.

Figure 9:
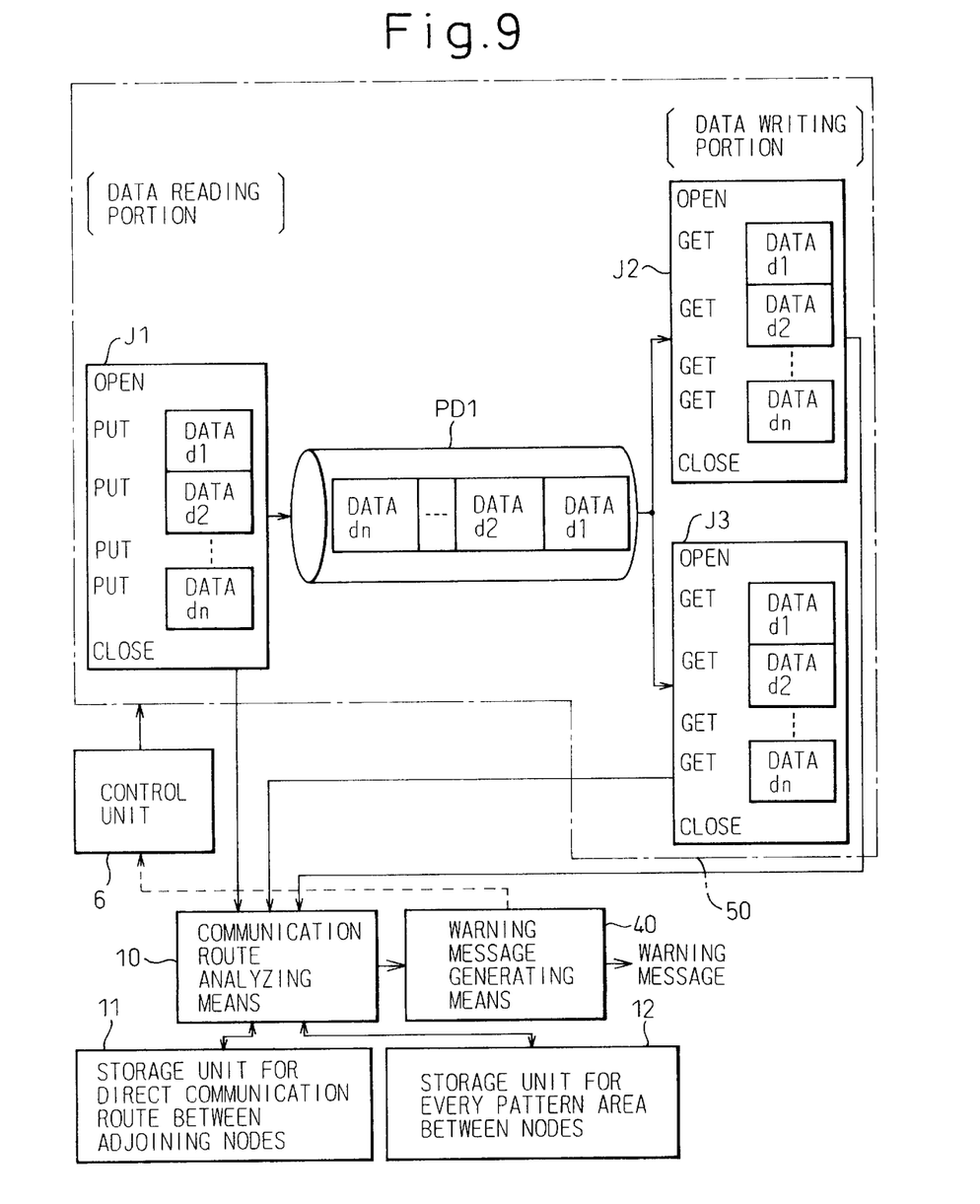
FIG. 9 is a block diagram showing an example of a mechanism for transferring data between job steps realized when the data processing apparatus of the preferred embodiment of the present invention is adapted for an Excel Batch.
Figure 10:
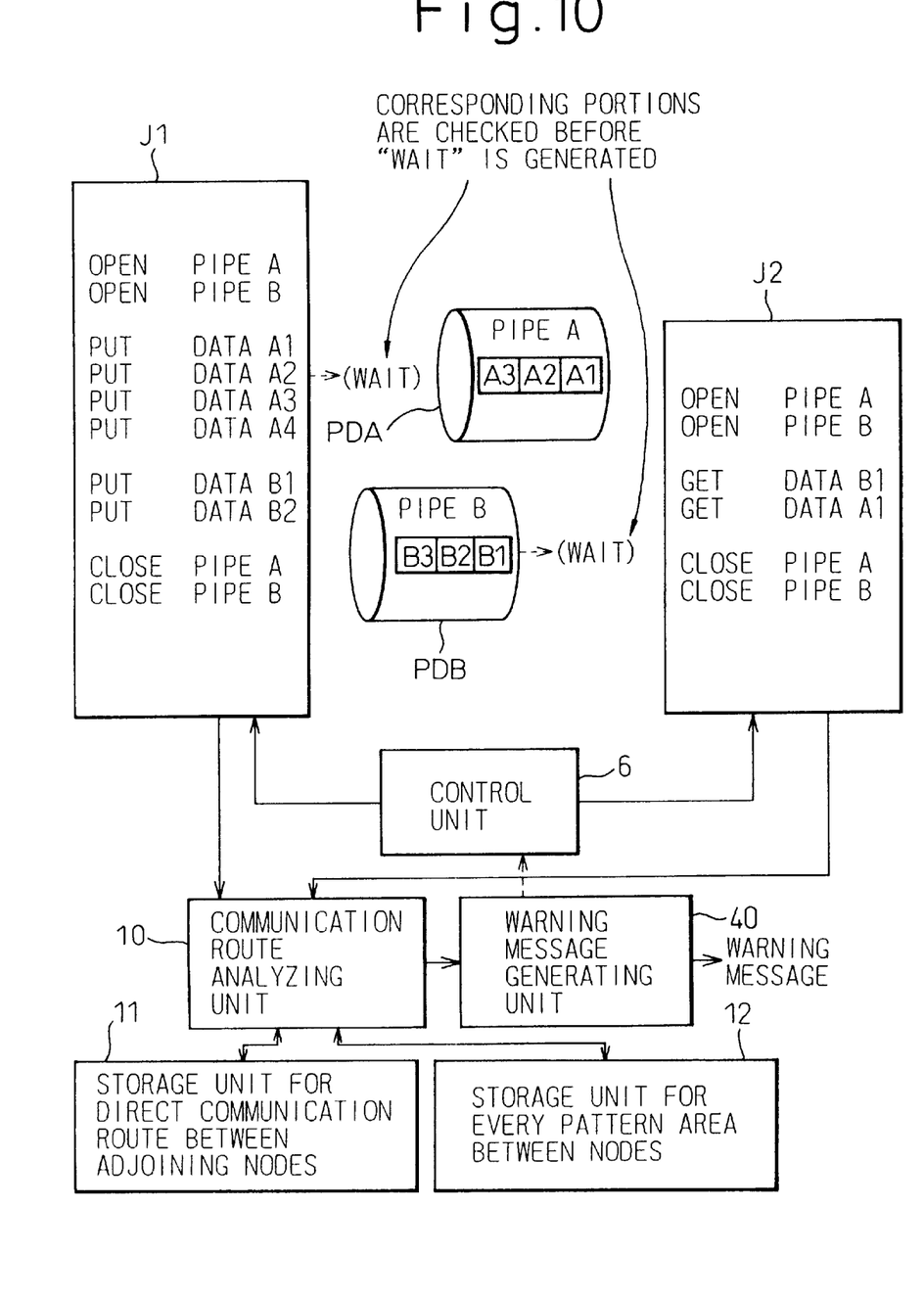
FIG. 10 is a block diagram showing a detection of patterns of communication routes causing a deadlock prior to an execution of a parallel group in the data processing apparatus of the preferred embodiment of the present invention.

Referring to FIGS. 9 and 10, a data transfer mechanism, realized when the data processing apparatus in accordance with the preferred embodiment of the present invention is adapted for a job process using an Excel Batch, will be described.

FIG. 9 is a block diagram showing an example of a data transfer mechanism realized between job steps when the data processing apparatus of the present invention is adapted for an Excel Batch. FIG. 10 is a block diagram showing how the data processing apparatus of the present invention detects patterns of communication routes causing a deadlock prior to an execution of a parallel group.

FIG. 9 shows an example of a job composed of first to third job steps J1, J2, and J3, one pipe data set (first pipe data set) PD1 for temporarily storing a plurality of data d1, d2, . . . and dn. For simplifying the explanation about such an example, it is assumed that data are transferred via a single pipe data set. The mechanism for transferring data when the job shown in FIG. 9 is recognized as the data network pattern 50, will be made clear by the following steps <1> to <6>.

<1> When a state "Open" is executed for the first time within each of the first to third job steps J1, J2, and J3, an environment for a pipe data set is reserved in a storage unit. When "Open" is executed at any other time, another environment for making an access to the pipe data set is established.

<2> A job step for reading out data from the pipe data set has been opened first, and a data reading process has been started. However, if a data writing portion has not operated, or if a data writing process has not been started, during reading out that data, the data processing apparatus waits for data being generated at the writing portion.

<3> The writing portion writes (a state "Put") data in the pipe data set in order of data d1, data d2, . . . , data d(n−1), and data dn. The thus written data are temporarily stored in the pipe data set.

<4> When data has been written, a data reading portion is enabled to read out the data. The data is read out in the order of data d1, data d2, . . . , data d(n−1), and data dn. The same data as these data are passed to all the reading portions (a state "Get"). When all the reading portions have read out the data, the connection with the pipe data set, in which the data are stored, is released.

<5> When the pipe data set has become full of data, the data processing apparatus waits for the reading portion finishing reading out data and also waits for an area of the pipe data set becoming empty (a state "Close"). When it is found during such a reading process that no data is present in the pipe data set, the data processing apparatus waits for the writing portion finishing writing data (a state "Close").

<6> By carrying out the procedure of steps <1> to <5>, the writing portion and reading portion can execute a plurality of job steps asynchronously in parallel.

In the data network pattern 50 shown in FIG. 9, a data processing apparatus having the same configuration as that of the embodiment shown in FIG. 5 is provided. Herein, the description of the data processing apparatus will not be reiterated. By providing the above-mentioned data processing apparatus, even when a plurality of pipe data sets are present as described later in conjunction with FIG. 10, a pattern of communication routes causing a deadlock can be detected, prior to the execution of a group of job steps (that is, a parallel group) composed of a plurality of job steps which are to be executed in parallel.

Shown in FIG. 10 is an example of a job composed of a first job step J1, a second job step J2, a first pipe data set PDA for temporarily storing a plurality of data A1, A2, and A3, and a second pipe data set PDB for temporarily storing a plurality of data B1, B2, and B3 (in FIG. 10, the first pipe data set PDA and second pipe data set PDB are referred to as pipe A and pipe B, respectively).

In FIG. 10, operations of data reading and data writing within the first job step J1 and second job step J2 are executed in parallel. However, when the operations of data reading and data writing are executed in parallel, as described previously, there arises a possibility that a deadlock occurs due to an occurrence of a wait state for data transmission or reception. Conventionally, when a deadlock occurs, after the waiting time specified by a system has elapsed, a job is terminated with a code indicating an occurrence of a long wait state (state "Wait").

For example, according to a conventional data processing system, if a deadlock occurs several hours after the start of executing a parallel group, an occurrence of the deadlock cannot be recognized until several hours or more than several hours have elapsed.

On the contrary, for example, when the data processing apparatus in accordance with the preferred embodiment (FIG. 5) of the present invention is provided in a system, since a pattern of communication routes causing a deadlock can be detected prior to execution of a job, the corresponding part of the job can be checked prior to the execution of the job.

As described above, in a data processing apparatus according to a preferred embodiment of the present invention, first, the number of patterns of all communication routes existing between a given node and another node is calculated. A pair of nodes in which the number of patterns of communication routes is, for example, two or larger than two is then detected. Thus, patterns of communication routes causing a deadlock due to an occurrence of a wait state for data transmission or reception can be checked prior to the start of execution of a job.

Moreover, in the data processing apparatus according to the preferred embodiment of the present invention, second, a matrix having elements, each of which indicates the number of direct communication routes directly linking a pair of nodes, is produced. As for a pair of nodes linked by a direct communication route, if a direct or indirect communication route extends from one of the pair to another node or other nodes, the corresponding element in a matrix is increased by the number of direct or indirect communication routes. The number of patterns of all communication routes existing between each pair of nodes can thus be calculated. Consequently, patterns of communication routes causing a deadlock can be detected by using a simple algorithm.

Furthermore, in the data processing apparatus according to the preferred embodiment of the present invention, third, when a job control language is input to a data network, if data is processed in parallel by a parallel batch job (i.e., an Excel Batch),. patterns of communication routes causing a deadlock between each pair of processes can be detected prior to the execution of the processes.

What is claimed is:

1. A data processing apparatus monitoring data communication in a data network composed of a plurality of nodes and in which data flows between nodes thereof via communication channels for transmitting data unidirectionally, said apparatus comprising:

means for forming a matrix comprising a plurality of elements, each element corresponding to a pair of nodes in the data network and representing a first count of direct communication routes directly linking the pair of nodes to which the element corresponds, the counted direct communication routes including the ones of the communication channels transmitting data between the pair of nodes to which the element corresponds;

means for calculating, based on the matrix, a second count of a group of patterns of communication routes existing between a specified pair of nodes in the data network, the specified pair of nodes including a first node transmitting data and a second node receiving the data transmitted by the first node, the group of patterns of communication routes including each direct communication route between the specified pair of nodes and each indirect communication route between the specified pair of nodes; and means for detecting the specified pair of nodes and outputting a warning message when the second count is greater than or equal to a predetermined value, the warning message indicating that a risk exists of deadlock between the specified pair of nodes.

2. A data processing apparatus as set forth in claim 1, wherein said calculating means calculates the second count by generating a sum when the first node of the specified pair of nodes is linked by a direct communication route to a third node of the data network, the sum including the first count for the specified pair of nodes added to a count of direct communication routes and indirect communication routes linking the third node to the second node.

3. A data processing apparatus as set forth in claim 1, wherein:

the data network processes specified data through a parallel batch process in accordance with a job control language input to the data network and comprising a plurality of job steps;

each of the job steps corresponds to one of the plurality of nodes; and each of the communication channels corresponds to a pipe data set serving as a temporary memory area for data.

4. A data processing apparatus as set forth in claim 2, wherein:

the data network processes specified data through a parallel batch process in accordance with a job control language input to the data network and comprising a plurality of job steps;

each of the job steps corresponds to one of the plurality of nodes; and each of the communication channels corresponds to a pipe data set serving as a temporary memory area for data.

5. A device for detecting a risk of data network deadlock, comprising:

a storage that stores a direct route table providing, for each pair of nodes in a data network comprising a plurality of nodes, an enumeration of direct communication routes directly linking a transmitting node of the node pair to a receiving node of the node pair; and a route analyzer that generates for a selected node pair, based on the direct communication route enumerations, an enumeration of paths from the transmitting node of the selected node pair to the receiving node of the selected node pair, the enumerated paths including each direct communication route between the selected node pair and each indirect communication route between the selected node pair, a warning signal being generated when the enumeration of paths exceeds a predetermined value.

6. A method for detecting a risk of data network deadlock, the method comprising:

generating, for each pair of nodes in a data network comprising a plurality of nodes, an enumeration of direct communication routes directly linking a transmitting node of the node pair to a receiving node of the node pair; and generating for a selected node pair, based on the direct communication route enumerations, an enumeration of paths from the transmitting node of the selected node pair to the receiving node of the selected node pair, the enumerated paths including each direct communication route between the selected node pair and each indirect communication route between the selected node pair, a warning signal being generated when the enumeration of paths exceeds a predetermined value.

7. A computer-readable medium encoded with a program for detecting a risk of data network deadlock, the program comprising:

generating, for each pair of nodes in a data network comprising a plurality of nodes, an enumeration of direct communication routes directly linking a trans mitting node of the node pair to a receiving node of the node pair; and generating for a selected node pair, based on the direct communication route enumerations, an enumeration of paths from the transmitting node of the selected node pair to the receiving node of the selected node pair, the enumerated paths including each direct communicating route between the selected node pair and each indirect communication route between the selected node pair, a warning signal being generated when the enumeration of paths exceeds a predetermined value.

* * * * *

UNITED STATES PATENT AND TRADEMARK OFFICE
CERTIFICATE OF CORRECTION

PATENT NO. : 6,178,459 B1
DATED : January 23, 2001
INVENTOR(S) : Etsuo Sugiyama

Page 1 of 1

It is certified that error appears in the above-identified patent and that said Letters Patent is hereby corrected as shown below:

<u>Column 16,</u>
Line 7, change "communicating" to -- communication --.

Signed and Sealed this

Twenty-fifth Day of September, 2001

Attest:

*Nicholas P. Godici*

NICHOLAS P. GODICI
*Attesting Officer*     *Acting Director of the United States Patent and Trademark Office*